(12) United States Patent
Armesto-Beyer (10) Patent No.: US 12,487,615 B2
(45) Date of Patent: Dec. 2, 2025

(54) GAS-PRESSURE REGULATOR

(71) Applicant: TRUMA GERAETETECHNIK GMBH & CO. KG, Putzbrunn (DE)

(72) Inventor: Kai Armesto-Beyer, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 201 days.

(21) Appl. No.: 18/267,650

(22) PCT Filed: Oct. 13, 2021

(86) PCT No.: PCT/EP2021/000123
§ 371 (c)(1),
(2) Date: May 9, 2024

(87) PCT Pub. No.: WO2022/148521
PCT Pub. Date: Jul. 14, 2022

(65) Prior Publication Data
US 2024/0288887 A1    Aug. 29, 2024

(30) Foreign Application Priority Data
Jan. 11, 2021 (DE) .......................... 102021000069.2

(51) Int. Cl.
*G05D 16/06* (2006.01)
(52) U.S. Cl.
CPC ......... *G05D 16/0691* (2013.01); *G05D 16/06* (2013.01); *G05D 16/0608* (2013.01);
(Continued)

(58) Field of Classification Search
CPC ............... G05D 16/0691; G05D 16/06; G05D 16/0608; G05D 16/0613; G05D 16/0633;
(Continued)

(56) References Cited

U.S. PATENT DOCUMENTS 2,867,234 A * 1/1959 Billington .......... G05D 16/0683
137/505.46
2,898,930 A * 8/1959 St Clair ............. G05D 16/0694
137/505.46
(Continued)

FOREIGN PATENT DOCUMENTS

DE 551843 A 6/1932
DE 102019103201 A1 8/2020
(Continued)

*Primary Examiner* — Craig M Schneider
*Assistant Examiner* — Christopher D Ballman
(74) *Attorney, Agent, or Firm* — McNees Wallace & Nurick LLC (57) ABSTRACT

Example embodiments relate to a gas-pressure regulator having an inlet, an outlet, a housing, a diaphragm, a control element, a control chamber and a discharge chamber. The inlet and the outlet each open onto the control chamber, wherein the diaphragm partially delimits the control chamber. The diaphragm and the control element are movable relative to each other, wherein a passage between the control chamber and the discharge chamber is open in a relative discharge arrangement of the diaphragm and the control element. An adjustable biasing element impedes a relative movement between the diaphragm and the control element.

3 Claims, 6 Drawing Sheets

(52) U.S. Cl.
CPC ....... G05D 16/0613 (2013.01); G05D 16/063 (2013.01); G05D 16/0633 (2013.01); G05D 16/0675 (2013.01); G05D 16/0683 (2013.01); *Y10T 137/261* (2015.04); *Y10T 137/7793* (2015.04); *Y10T 137/783* (2015.04)

(58) Field of Classification Search
CPC ............. G05D 16/063; G05D 16/0675; G05D 16/0683; Y10T 137/261; Y10T 137/7793; Y10T 137/783
See application file for complete search history.

(56) References Cited

U.S. PATENT DOCUMENTS

| | | | | | |
|---|---|---|---|---|---|
| 3,032,054 | A | * | 5/1962 | Irwin | G05D 16/0694 137/484.4 |
| 3,056,424 | A | * | 10/1962 | Courtot | G05D 16/0686 137/505.46 |
| 3,160,169 | A | * | 12/1964 | Peterson | G05D 16/0683 137/859 |
| 3,386,465 | A | * | 6/1968 | Johnson | G05D 16/0694 137/505.46 |
| 3,488,685 | A | * | 1/1970 | Hughes | G05D 16/0683 137/505.46 |
| 3,599,658 | A | | 8/1971 | Kruzan et al. | |
| 3,705,599 | A | * | 12/1972 | Sheward | G05D 16/0688 137/505.11 |
| 4,069,839 | A | * | 1/1978 | Hughes | G05D 16/0686 137/505.46 |
| 4,245,669 | A | * | 1/1981 | Schmidt | G05D 7/0106 137/550 |
| 4,503,883 | A | * | 3/1985 | Meacham, Jr. | G05D 16/0686 137/461 |
| 4,974,630 | A | * | 12/1990 | Chang | G05D 16/0683 137/460 |
| 5,131,425 | A | * | 7/1992 | Sturgis | G05D 16/0683 137/505.46 |
| 5,697,398 | A | * | 12/1997 | Gidney | G05D 16/0683 137/484.8 |
| 5,735,306 | A | * | 4/1998 | Olds | G05D 16/0686 137/505.46 |
| 6,431,205 | B1 | * | 8/2002 | Bartos | G05D 16/0686 137/505.46 |
| 7,261,119 | B2 | * | 8/2007 | Olds | G05D 16/0686 137/505.46 |
| 8,156,958 | B2 | * | 4/2012 | Zhang | G05D 16/0683 137/505.11 |
| 8,256,452 | B2 | * | 9/2012 | Hawkins | G05D 16/0688 137/505.46 |
| 8,336,574 | B2 | * | 12/2012 | Kranz | G05D 16/0683 137/484.4 |
| 8,500,092 | B2 | * | 8/2013 | Quijano | G05D 16/0683 137/613 |
| 8,695,629 | B2 | * | 4/2014 | Hsiao | G05D 16/0691 137/505.46 |
| 8,939,167 | B2 | * | 1/2015 | Mevius | F16K 31/165 137/116.5 |
| 9,709,998 | B2 | * | 7/2017 | Blanchard | G05D 16/0402 |
| 10,222,811 | B2 | * | 3/2019 | Jing | F16K 17/34 |
| 10,316,987 | B2 | * | 6/2019 | Jing | F16K 17/048 |
| 10,364,906 | B1 | * | 7/2019 | Cassidy | G05D 16/0683 |
| 11,193,602 | B2 | * | 12/2021 | Amadini | B01D 46/4272 |
| 2012/0111425 | A1 | | 5/2012 | Hawkins et al. | |
| 2019/0155316 | A1 | * | 5/2019 | Silvius | F16K 17/048 |

FOREIGN PATENT DOCUMENTS

| | | |
|---|---|---|
| GB | 582051 A | 11/1946 |
| WO | 2020030398 A1 | 2/2020 |
| WO | 2020160948 A1 | 8/2020 |

\* cited by examiner

Fig. 1

Prior Art

GAS-PRESSURE REGULATOR

TECHNICAL FIELD

The present disclosure relates to a gas-pressure regulator.

BACKGROUND

Gas-pressure regulators are described in documents DE 10 2019 103 201 A1 or WO 2020/030398 A1, for example. The regulators reduce the gas pressure from a gas source to a gas pressure for downstream consumers. Some regulators have a pressure relief valve which discharges gas to the surroundings in case of an excessive pressure. This overpressure is above the normally usual pressure applied. Regulators having pressure relief valves are described in documents DE 551 843 A or GB 582,051 A, for example. For specific cases of application, for example for camping, it is provided to perform leakage tests on the gas-pressure regulators and the downstream low-pressure system. However, the applied pressure here is in most cases above the pressure at which the pressure relief valve reacts.

Therefore, in view of the problems associated with conventional gas-pressure regulators, there remains a need to propose a gas-pressure regulator which has a kind of pressure relief valve and simultaneously permits an overpressure test.

SUMMARY

The present disclosure achieves the object by a gas-pressure regulator having an inlet, an outlet, a housing, a diaphragm, a control element, a control chamber and a discharge chamber, wherein the inlet and the outlet each open onto the control chamber, wherein the diaphragm partially delimits the control chamber, wherein the diaphragm and the control element are configured and arranged within the housing such that the diaphragm and the control element are movable relative to each other, wherein a passage between the control chamber and the discharge chamber is open in a relative discharge arrangement of the diaphragm and the control element, and wherein an adjustable biasing element is provided which impedes a relative movement between the diaphragm and the control element.

The gas-pressure regulator according to example embodiments has an inlet and an outlet each opening onto a control chamber. In this control chamber, the reduction of the applied gas pressure to the desired gas pressure is carried out. The diaphragm is provided for pressure regulation and partially delimits the control chamber, i.e. forms part of the peripheral wall of the control chamber. The diaphragm is movably arranged within the housing of the gas-pressure regulator. During normal operation, this movability serves to regulate the pressure by changing the volume of the control chamber. A passage between the control chamber and a discharge chamber is open in a relative position of the diaphragm and the control element (i.e. the discharge arrangement). If in the normal state, gas flows only within the control chamber, a passage to a discharge chamber is thus produced. The discharge chamber is thus preferably connected to the outside world around the gas-pressure regulator. Therefore, the function of a pressure relief valve is provided by the passage and the discharge chamber. In one configuration, the control element is designed as a type of plunger, wherein in one configuration, one end face is arranged below the diaphragm in the control chamber, so that the diaphragm almost rests on this end face. A biasing element is additionally provided. The biasing element itself is configured and arranged so as to be movable. This serves the purpose that it can be moved from one position to another. If the purpose of the biasing element is to block the pressure relief valve only for a leakage test, it is necessary that the biasing element is active only temporarily and in particular only during the test. Therefore, the movability is provided so that the biasing element can be moved away again. For this purpose, in one configuration, two fixed positions are provided which the biasing element can occupy and between which it can be moved—for example, by the action of a user. The biasing element serves to impede the relative movement between the diaphragm and the control element. This is to prevent the passage between the diaphragm and the control element from opening. Thus, the pressure relief valve is blocked and the pressure test can be performed. Conversely, after the pressure test for normal operation, the pressure relief valve can be reactivated.

One configuration provides that the biasing element prevents the discharge arrangement from being reached. In this configuration, the biasing element ensures that the relative discharge arrangement between the diaphragm and the control element cannot be reached so that the passage is not open.

One configuration includes that the gas-pressure regulator further has a spring component, that the relative movement between the diaphragm and the control element takes place against a spring force of the spring component, and that the biasing element acts on the spring force. In this configuration, a spring component causes the passage between the diaphragm and the control element to remain closed. Opening of the passage is therefore only possible if a force greater than the spring force is applied.

One configuration provides that the biasing element is configured and arranged so as to be movable relative to the control element, and that a closing force of the spring component depends on a position of the biasing element relative to the control element. The closing force is the force with which the spring component closes the passage. In this configuration, the biasing element can be moved relative to the control element. In one configuration, this occurs axially along a longitudinal axis of the control element. Depending on the position of the biasing element, a different closing force is respectively obtained.

In one embodiment, the biasing element is movably mounted on the control element and is pressed against a fixed bearing point at the end of the control element by the spring component (an alternative designation is: PRV spring for Pressure Relief Valve). The biasing element has at least two bearing levels at different heights along the control element. By rotation, the biasing element can be moved from one position to another and therefore be displaced along the axis of the control element. Insofar as the purpose of the biasing element is to block the pressure relief valve for a leakage test, it is necessary that the biasing element is only temporarily active and in particular only during the test. Therefore, the movability is provided so that the moving element can be moved away again. The biasing element serves to increase the closing force of the discharge valve. If the closing force is increased, this preferably ensures that the passage between the control chamber and the discharge chamber is not opened. Thus, the pressure relief valve is blocked and the pressure test can be performed.

One configuration includes that an eccentric component is provided, and that the eccentric component causes an axial movement of the biasing element along the control element.

An eccentric is a known way to convert between translational and rotational movements. Here, the eccentric component is used to displace the biasing element axially. In one configuration, this causes the spring component to be more or less compensated, thus changing the setting of the closing force.

In one configuration, the biasing element is movably mounted on the control element and is pressed by the spring component against an eccentrically rotatable bearing point at the end of the control element. The horizontal rotation of the eccentric allows the biasing element to be moved from one position to another and thus to be displaced along the axis of the control element.

One configuration includes that the control element projects through the diaphragm and that the passage between the control element and the diaphragm opens. In this configuration, the control element is located in the diaphragm and is thus—preferably radially—surrounded by the diaphragm. The passage is provided between the diaphragm and the control element.

In one configuration, the diaphragm and the control element have structures which overlap or complement each other in a relative arrangement such that the passage is closed. However, if the distance between the diaphragm and the control element sufficiently increases, the structures do no longer engage or complement each other, and the passage between the two components is opened. The gas can thus flow into the discharge chamber.

One configuration includes that a lever and a sealing element are movably arranged within the housing, that the sealing element is located between the inlet and the control chamber, and that the lever is in mechanical contact with the control element. This type of gas-pressure regulator is disclosed, for example, in document DE 10 2019 103 201 A1 or WO 2020/030398 A1 cited in the introductory part.

BRIEF DESCRIPTION OF DRAWINGS

More specifically, there are several possibilities of configuring and further developing the gas-pressure regulator. To this end, reference is made on the one hand to the claims subordinate to the independent claim, and on the other hand to the description below of example embodiments in conjunction with the drawing, in which:

DETAILED DESCRIPTION OF EXAMPLE EMBODIMENTS

Figure 1:
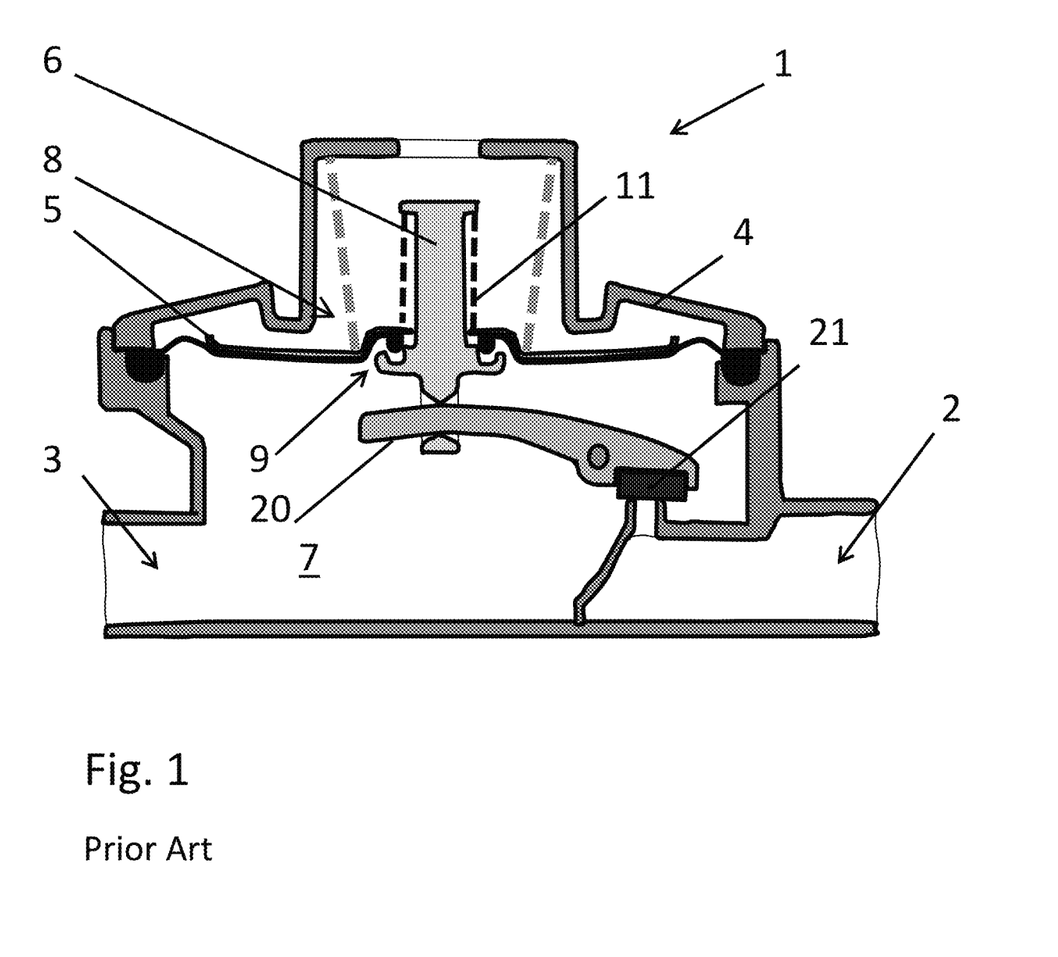
FIG. 1 shows a section through a configuration of a gas-pressure regulator according to the prior art.

FIG. 1 shows a section through a gas-pressure regulator 1 according to the prior art. A control chamber 7 which is delimited on the upper side by a movable diaphragm 5 is located within the housing 4 between an inlet 2 and an outlet 3 for the gas. The diaphragm 5 surrounds a plunger-shaped control element 6 which projects centrally through the diaphragm 5. The diaphragm 5 and the possibility to change the volume of the control chamber 7 through it, and the control element 6 which is connected to a lever 20 serve to regulate the pressure. On the side of the discharge chamber 8, the diaphragm 5 is loaded by a spring which pushes the diaphragm 5 in the direction of the control chamber 7. The lever 20 is rotatably mounted within the housing 4 and closes the inlet 2 into the control chamber by means of a sealing element 21.

For the case (represented here) that the applied gas pressure increases too much, a kind of pressure relief valve is provided. When the pressure increases, the diaphragm 5 moves away from the control chamber 7. A passage 9 is thus formed between the diaphragm 5 and the control element 6 in the center thereof. Due to his passage 9 or generally the opening between the center recess of the diaphragm 5 and the control element 6, the gas can flow out of the control chamber 7 and into the discharge chamber 8. The discharge chamber 8 is connected to the surroundings around the gas-pressure regulator 1 via an opening arranged at the upper end here. The fact that the passage 9 opens when a certain pressure in the control chamber 7 is reached however results in that a pressure test with a pressure above the value at which the pressure relief valve reacts is not possible. The closing force to be applied to open the passage 9 is caused by the spring component 11, which is supported on the control element 6 on the one hand and rests on the diaphragm 5 on the other hand.

Figure 2:
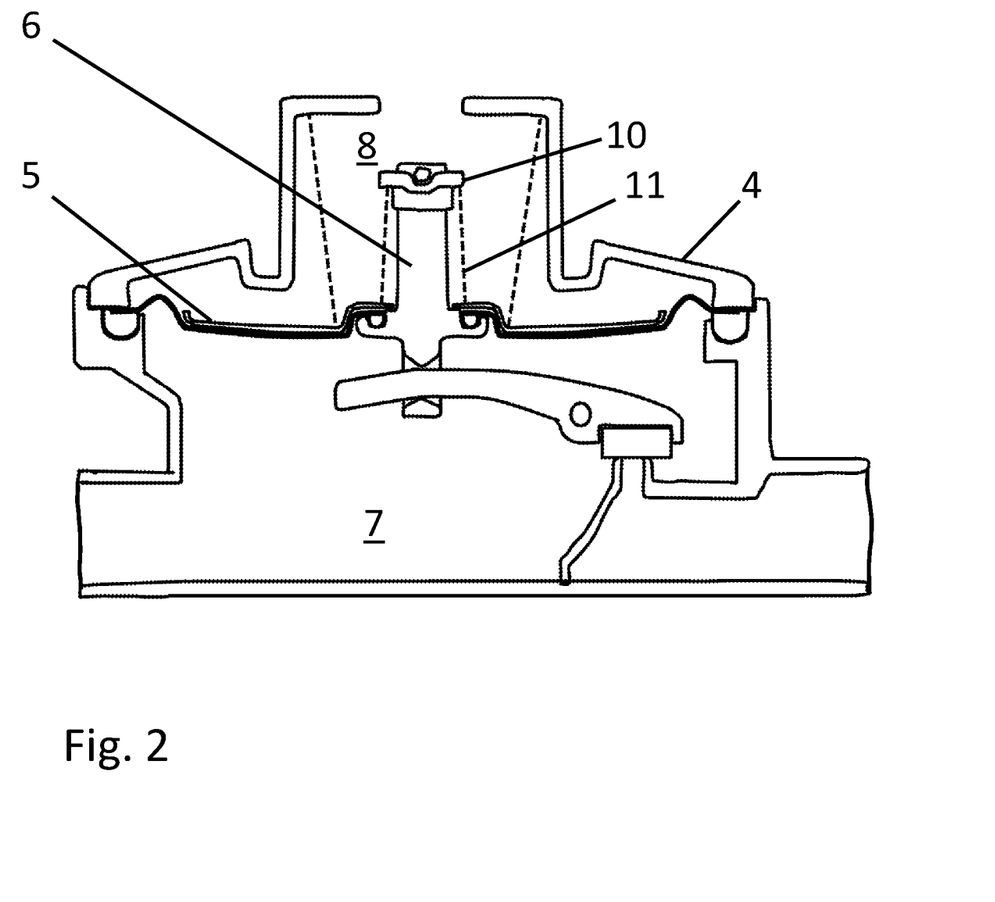
FIG. 2 shows a section through a first configuration of a gas-pressure regulator according to an example embodiment with an inactive biasing element in a first phase.

FIG. 2 shows a first configuration of the gas-pressure regulator 1 according to an example embodiment, identical components being denoted by the same reference numerals as in FIG. 1. Therefore, to avoid repetitions, only the differences will be described here.

The essential difference is the variably insertable biasing element 10 which is here located in the discharge chamber 8 above the diaphragm 5. The biasing element 10 has an effect on the closing force of the spring component 11 by compressing the spring component 11 more or less. In the state shown here, as a result of the higher position of the biasing element 10, the spring component 11 is compressed only to such an extent that in normal use, the passage for releasing the excess pressure opens (see FIG. 1).

Figure 3:
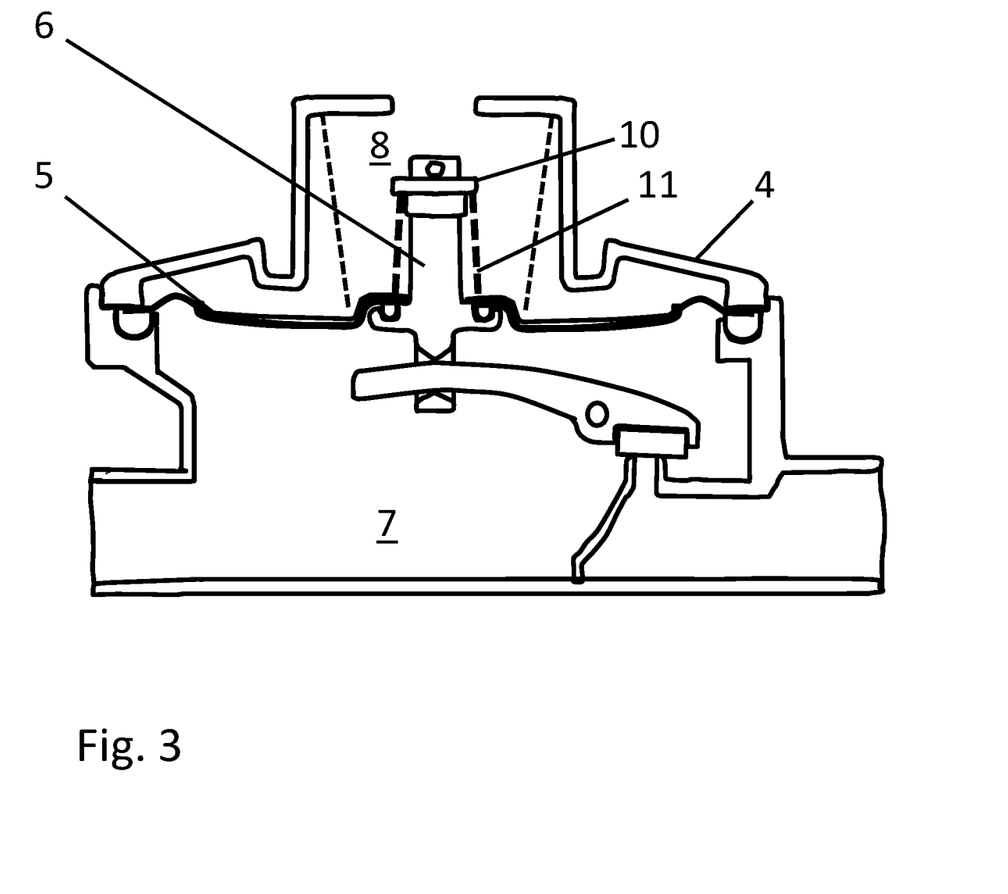
FIG. 3 shows the gas-pressure regulator of FIG. 2 with an active biasing element in a second phase.

FIG. 3 shows the case where the biasing element 10 is located axially along the control element 6 lower in the direction of the diaphragm 5, as a result of which the spring component 11 is compressed more strongly and a higher closing force is obtained. The pressure in the control chamber 7 can thus be increased to a significantly greater extent.

Figure 4:
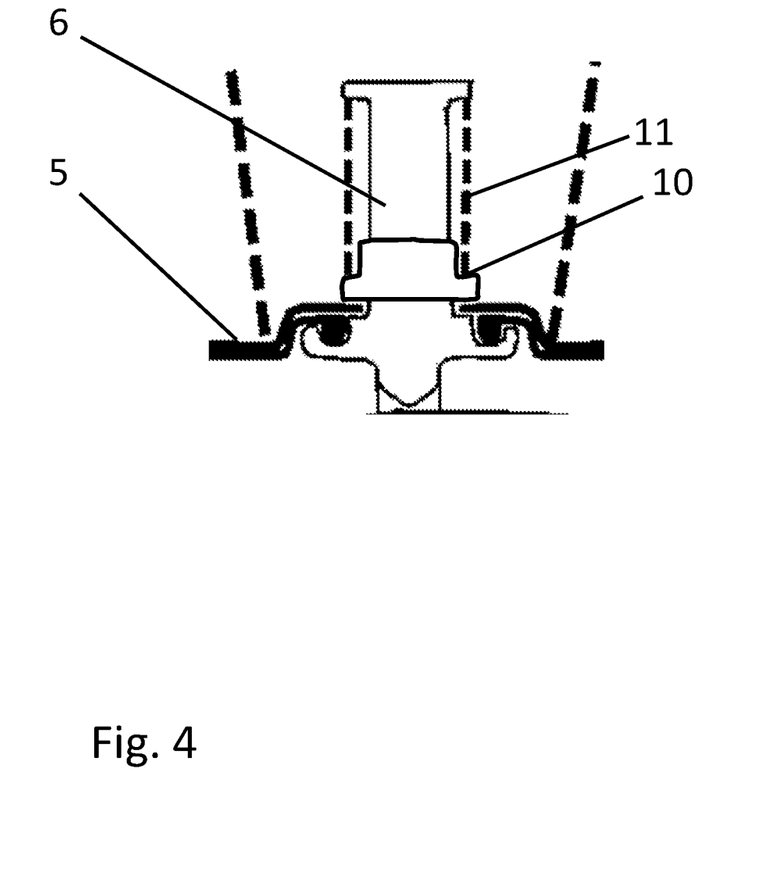
FIG. 4 shows a section through a second configuration of a gas-pressure regulator.

FIG. 4 shows a detail of a gas regulator similar to the variant in FIG. 2 and FIG. 3. The biasing element 10 is attached at the bottom near the diaphragm 5 and not—as in the variant of FIG. 2 and FIG. 3—in the direction of the end of the control element 6 facing away from the diaphragm 5.

The biasing element 10 of the configurations of FIG. 2 and FIG. 3 is rotatable about the longitudinal axis of the control element 6. In the inactive state (FIG. 2), a protrusion (provided, for example, by a pin which is passed through the upper end) of the control element 6 rests in a recess of the plate-like biasing element 10. As a result of the rotation of the biasing element 10, the protrusion no longer lies in the recess, so that the biasing element 10 assumes a lower axial position in the direction of the diaphragm 5 (FIG. 3).

Figure 5:
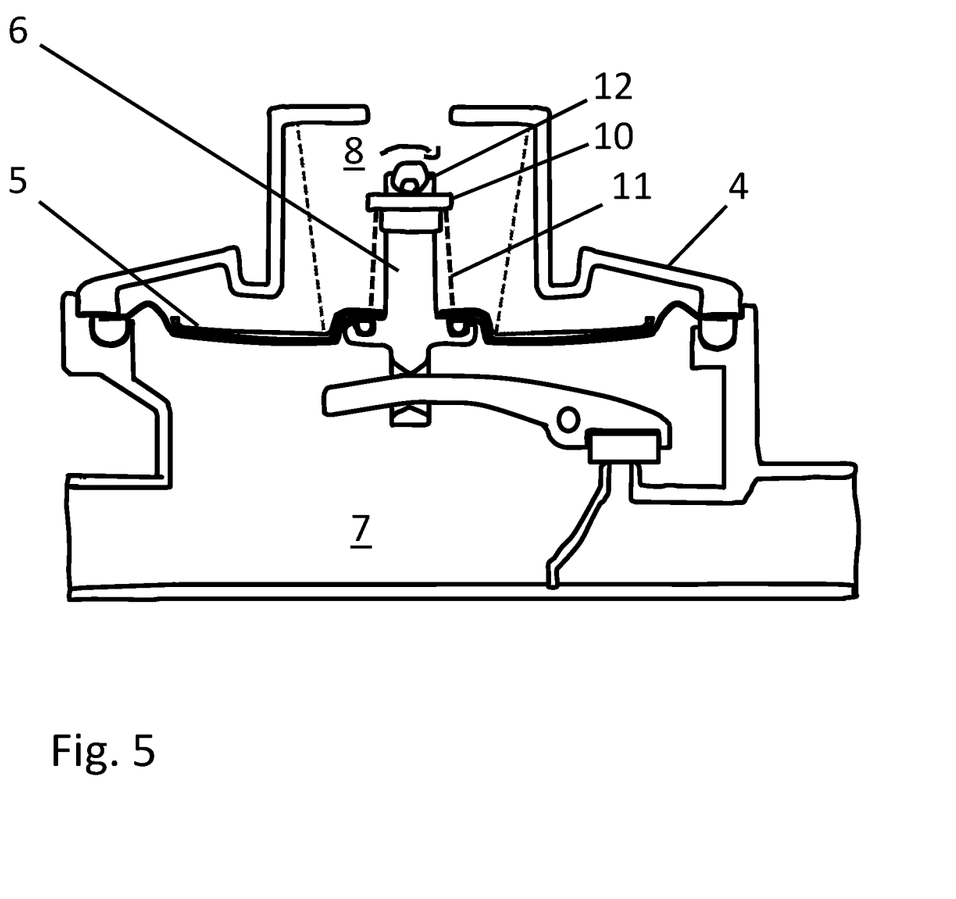
FIG. 5 shows a section through a third configuration of a gas-pressure regulator according to an example embodiment with an inactive biasing element in a first phase.
Figure 6:
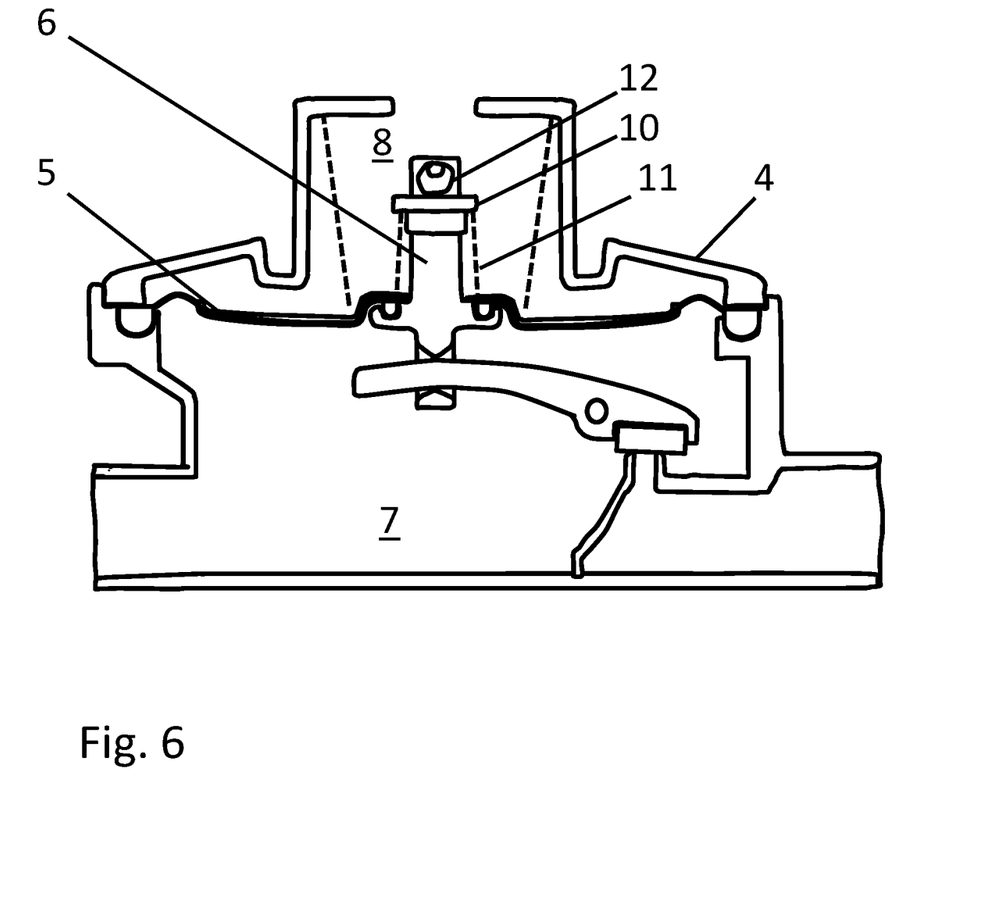
FIG. 6 shows the gas-pressure regulator of FIG. 5 with an active biasing element in a second phase.

In the variant of FIG. 5 and FIG. 6, an eccentric component 12 is provided which moves the biasing element 10 axially along the longitudinal axis of the control element 6. FIG. 5 shows the inactive state. The biasing element 10 is located at an upper axial end point. The eccentric component 12 is here also connected to the control element 6 and is again located above the biasing element 10. If the eccentric component 12 is rotated—as indicated here by the arrow—the biasing element 10 is moved axially in the direction of the diaphragm 5, which increases the closing force of the spring component 11, since it is more compressed. As a result, a higher force must be applied to open the passage between the diaphragm 5 and the control element 6.

LIST OF REFERENCE NUMERALS

1 gas-pressure regulator
2 inlet
3 outlet
4 housing
5 diaphragm
6 control element
7 control chamber
8 discharge chamber
9 passage
10 biasing element
11 spring component
12 eccentric component
20 lever
21 sealing element

The invention claimed is:

1. A gas-pressure regulator, comprising:
an inlet, an outlet, a housing, a diaphragm, a control element, a control chamber, a discharge chamber, an adjustable biasing element and a spring component,
wherein the inlet and the outlet each open onto the control chamber,
wherein the diaphragm partially delimits the control chamber,
wherein the diaphragm and the control element are configured and arranged within the housing such that the diaphragm and the control element are movable relative to each other,
wherein a passage between the control chamber and the discharge chamber is open in a relative discharge arrangement of the diaphragm and the control element,
wherein the adjustable biasing element impedes a relative movement between the diaphragm and the control element, wherein the relative movement between the diaphragm and the control element takes place against a spring force of the spring component,
wherein the adjustable biasing element acts on the spring force,
wherein the adjustable biasing element is configured and arranged so as to be movable relative to the control element,
wherein a closing force of the spring component depends on a position of the adjustable biasing element relative to the control element,
wherein the adjustable biasing element can assume one of two fixed positions and is movable between the two fixed positions,
wherein the adjustable biasing element prevents the discharge arrangement from being reached, and
wherein an eccentric component having an offset axis of rotation is provided, by which the eccentric component causes an axial movement of the adjustable biasing element along the control element, or
wherein, in an inactive state, a protrusion of the control element rests in a recess of the adjustable biasing element and, by a rotation of the adjustable biasing element about a longitudinal axis of the control element, the protrusion is located outside the recess so that the adjustable biasing element assumes a deeper axial position in a direction of the diaphragm.

2. The gas-pressure regulator according to claim 1,
wherein the control element projects through the diaphragm, and
wherein the passage opens between the control element and the diaphragm.

3. The gas-pressure regulator according to claim 1,
wherein a lever and a sealing element are movably arranged within the housing,
wherein the sealing element is located between the inlet and the control chamber, and
wherein the lever is in mechanical contact with the control element.

* * * * *